United States Patent
Chen et al.

(10) Patent No.: US 10,715,256 B1
(45) Date of Patent: Jul. 14, 2020

(54) RECOVERY OF PHASE-MODULATED DATA FROM AN OPTICAL SIGNAL VIA INTENSITY MEASUREMENTS

(71) Applicant: Nokia Solutions and Networks Oy, Espoo (FI)

(72) Inventors: Haoshuo Chen, Aberdeen, NJ (US); Roland Ryf, Aberdeen, NJ (US); Nicolas Fontaine, Aberdeen, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/290,854

(22) Filed: Mar. 1, 2019

Related U.S. Application Data

(60) Provisional application No. 62/807,227, filed on Feb. 18, 2019.

(51) Int. Cl.
*H04B 10/556* (2013.01)
*H04B 10/61* (2013.01)

(52) U.S. Cl.
CPC ......... *H04B 10/556* (2013.01); *H04B 10/613* (2013.01); *H04B 10/614* (2013.01); *H04B 10/6162* (2013.01)

(58) Field of Classification Search
CPC .. H04B 10/556; H04B 10/613; H04B 10/614; H04B 10/6162; H04B 10/66; H04B 10/5051
See application file for complete search history.

(56) References Cited

U.S. PATENT DOCUMENTS

| | | | | |
|---|---|---|---|---|
| 2007/0047954 A1* | 3/2007 | Mamyshev | ........... | G02F 1/0123 398/33 |
| 2007/0297796 A1* | 12/2007 | Calabro | ............... | H04B 10/505 398/43 |
| 2008/0212976 A1* | 9/2008 | Asano | ................... | H04B 10/505 398/161 |
| 2008/0232815 A1* | 9/2008 | Shioiri | ............... | H04B 10/5561 398/140 |
| 2008/0240721 A1* | 10/2008 | Ota | ...................... | H04B 10/677 398/115 |

(Continued)

OTHER PUBLICATIONS

D. Che et al., "Stokes Vector Direct Detection for Short-reach Optical Communication", Optics Letters, vol. 39, No. 11, 2014, pp. 3110-3113.

(Continued)

*Primary Examiner* — Mina M Shalaby
(74) *Attorney, Agent, or Firm* — Nokia Technologies Oy

(57) ABSTRACT

An apparatus includes an optical data receiver to receive a phase-modulated optical signal and to demodulate data therefrom. The optical data receiver includes an optical power splitter, first and second optical intensity detectors, and a digital signal processor. The digital signal processor is connected to receive digital values of intensity measurements of each of the optical intensity detectors. The first optical intensity detector is connected to receive light from the optical power splitter via a first optical path, and the second optical intensity detector is connected to receive light from the optical power splitter via a second optical path. The first and second optical paths have channel functions with different frequency dependencies.

19 Claims, 5 Drawing Sheets

(56) References Cited

U.S. PATENT DOCUMENTS

| | | | |
|---|---|---|---|
| 2009/0022498 A1* | 1/2009 | Shibutani | H04B 10/505 398/152 |
| 2010/0150568 A1* | 6/2010 | Lee | H04B 10/677 398/137 |
| 2011/0008054 A1* | 1/2011 | Castanon Avila | H04B 10/5055 398/140 |
| 2011/0222865 A1* | 9/2011 | Coelho | H04B 10/505 398/182 |
| 2012/0121264 A1* | 5/2012 | Chung | H04B 10/5053 398/65 |
| 2012/0281988 A1* | 11/2012 | Kikuchi | H04B 10/5561 398/159 |
| 2016/0112140 A1* | 4/2016 | Rahn | H04B 10/0775 398/79 |
| 2016/0119077 A1* | 4/2016 | Hu | H04B 10/516 398/76 |
| 2016/0269105 A1* | 9/2016 | Yoshida | H04B 10/032 |
| 2017/0207875 A1* | 7/2017 | Yoshida | H04B 10/032 |
| 2018/0364356 A1* | 12/2018 | Eichenholz | G01S 17/105 |
| 2019/0052388 A1* | 2/2019 | Yu | H04J 14/02 |
| 2019/0109666 A1* | 4/2019 | Kato | H04J 14/0256 |
| 2019/0158190 A1* | 5/2019 | Huh | H04J 14/02 |

OTHER PUBLICATIONS

A. Mecozzi et al., "Kramers—Kronig Coherent Receiver", Optica, vol. 3, No. 11, 2016, pp. 1220-1227.

M. Morsy-Osman et al., "Four-Dimensional Modulation and Stokes Direct Detection of Polarization Division Multiplexed Intensities, Inter Polarization Phase and Inter Polarization Differential Phase", Journal of Lightwave Technology, vol. 34, No. 7, Apr. 1, 2016, pp. 1585-1592.

X. Chen et al., "4 × 240 Gb/s Dense WDM and PDM Kramers—Kronig Detection with 125-km SSMF Transmission", European Conference on Optical Communication (ECOC), Sep. 17-21, 2017, 3 pages.

C. Madsen et al., "Integrated all-pass Filters for Tunable Dispersion and Dispersion Slope Compensation", IEEE Photonics Technology Letters, vol. 11, No. 12, Dec. 1999, pp. 1623-1625.

R.W. Gerchberg et al., "A Practical Algorithm for the Determination of Phase from Image and Diffraction Plane Pictures", Optik, vol. 35, No. 2 (1972) pp. 237-246.

Article "Gerchberg-Saxton algorithm", available online at www.en.wikipedia.org on May 15, 2018, 3 pages.

\* cited by examiner

RECOVERY OF PHASE-MODULATED DATA FROM AN OPTICAL SIGNAL VIA INTENSITY MEASUREMENTS

This application claims the benefit of U.S. provisional application No. 62/807,227, filed Feb. 18, 2019, by Haoshuo Chen, Nicolas K. Fontaine, and Roland Ryf.

BACKGROUND

Technical Field

The inventions relate to apparatus and methods for data communication with optical fibers.

Discussion of the Related Art

This section introduces aspects that may be helpful to facilitating an understanding of the inventions. Accordingly, the statements of this section are to be read in this light and are not to be understood as admissions about what is prior art or what is not prior art.

Presently, there are multiple techniques for demodulating a data stream from an optical signal, on which data has been modulated via phase shift keying. For complex constellations such as quadrature phase shift keying (QPSK) and quadrature amplitude modulation (QAM), some of the methods may use a Stokes vector optical data receiver or a Kramers-Kronig optical data receiver. Such optical data receivers may provide lower-cost devices for recovering data from a phase-modulated optical signal than coherent optical data receivers, which use local optical oscillators.

BRIEF SUMMARY OF EXEMPLARY EMBODIMENTS

Unfortunately, some conventional designs for an optical data receiver seem to have disadvantages. For example, conventional designs for Stokes vector, optical data receivers often seem almost as complex as those for coherent optical data receivers, when the Stokes vector, optical data receivers are configured to support polarization diversity. Also, some designs for Kramers-Kronig, optical data receivers include a local optical oscillator to avoid frequency fading. Herein, various embodiments provide simple optical data receivers based on direct detection of the optical signal. Some such embodiments may support polarization multiplexing and/or optical lateral-spatial-propagation-mode multiplexing.

In first embodiments, an apparatus includes an optical data receiver to receive a phase-modulated optical signal and to demodulate data therefrom. The optical data receiver includes an optical power splitter, first and second optical intensity detectors, and a digital signal processor. The digital signal processor is connected to receive digital values of intensity measurements of each of the optical intensity detectors. The first optical intensity detector is connected to receive light from the optical power splitter via a first optical path, and the second optical intensity detector is connected to receive light from the optical power splitter via a second optical path. The first and second optical paths have channel functions with different frequency dependencies.

In any of the first embodiments, the digital signal processor may be configured to recover, at least, phase-modulated data from the optical signal based on the digital values of intensity measurements of the optical intensity detectors.

In any of the first embodiments, the first and second optical paths may be configured to produce different amounts of dispersion.

In any of the first embodiments, the optical data receiver may be configured, at least, to recover phase-modulated data from the optical signal without mixing the optical signal with light from a local optical oscillator and/or without interfering a first portion of the optical signal with a relatively delayed, second portion of the optical signal.

In any of the first embodiments, the optical data receiver may be configured, at least, to recover phase-modulated data from two polarizations of a polarization multiplexed optical signal and/or from, at least, two optical lateral-spatial propagation-modes of a propagation-mode-multiplexed optical signal.

In any of the first embodiments, the optical data receiver may be configured to determine a relative channel function for optical propagation along one of the optical paths and then, optical propagation along the other of the optical paths.

In any of the first embodiments, the apparatus may further include an optical data transmitter configured to phase-modulate data onto an optical carrier and optically connected to transmit the phase-modulated optical carrier to the optical data receiver.

In any of the first embodiments, each optical intensity detector may include an array of optical intensity detectors, wherein each optical intensity detector of the array is connected to a different optical output of an optical wavelength demultiplexer.

In any of the first embodiments, the optical data receiver may further include a third optical intensity detector connected to the optical power splitter via a third optical path. In such embodiments, the digital signal processor is connected to receive digital values of intensity measurements of the third optical intensity detector, and the third optical path has a channel function with different frequency dependency than the first and second optical paths.

In second embodiments, a method includes, in a direct-detection optical data receiver, optically intensity separating first and second portions of a data-modulated optical signal such that the first portion accumulates a first chromatic dispersion by propagating to a first optical intensity detector and the second portion accumulates a different second chromatic dispersion by propagating to a second optical intensity detector. The method also includes digitally recovering a phase-modulated data stream carried by the data-modulated optical signal from a sequence of intensity measurements received from the optical intensity detectors, wherein the measurements are responsive to the separating.

In any of the second embodiments, the method may further include, at the optical data receiver, lateral-spatial propagation-mode demultiplexing the data-modulated optical signal into multiple parts. In such embodiments, the digitally recovering includes, at least, recovering phase-modulated data from intensity measurements on individual ones of the parts.

In any of the second embodiments, the method may further include, at the optical data receiver, optical polarization demultiplexing the data-modulated optical signal into multiple parts. In such embodiments, the digitally recovering includes, at least, recovering phase-modulated data from intensity measurements on individual ones of the parts.

In any of the second embodiments, the method may further include determining a relative channel function for optical propagation backward from one of the optical intensity detectors to a region of the separating and then, optical propagation forward from the region to the other of the optical intensity detectors.

In any of the second embodiments, the method may further include optical wavelength demultiplexing each separated portion such that the intensity measurements include intensity measurements for different optical wavelength channels.

In any of the second embodiments, the optically intensity separating may cause a third portion of the data-modulated optical signal to accumulate a third chromatic dispersion by propagating to a third optical intensity detector. The third chromatic dispersion is different from both of the first and second chromatic dispersions. In such embodiments, the digitally recovering may be based on digital values of intensity measurements by the third optical intensity detector.

BRIEF DESCRIPTION OF THE DRAWINGS

In the Figures and text, like reference symbols indicate elements with similar or the same function and/or similar or the same structure(s).

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

This application incorporates herein, by reference, in its entirety, U.S. provisional application No. 62/807,227, filed Feb. 18, 2019, by Haoshuo Chen et al.

Various embodiments relate to recovering values of phase(s) modulated on optical signals by employing direct detection of intensities of the received phase-modulated optical signal. These embodiments typically do not measure interference of said phase-modulated optical signal with light from a local optical oscillator in the optical data receiver and typically do not measure interference between two portions of said received phase-modulated optical signal, which have been relatively delayed in the optical data receiver. Various ones of the embodiments may be less expensive than coherent optical data receivers in which lasers are used as local oscillator and may, in some examples, support lateral-spatial propagation-mode multiplexing and/or polarization multiplexing. In various embodiments, different optical processing is applied to two separate portions of a received optical signal prior to make intensity measurements thereof for use in the recovery of the phase-modulated data carried by the optical signal. In some embodiments, the optical data receiver may be implementable via photonic integration.

Figure 1:
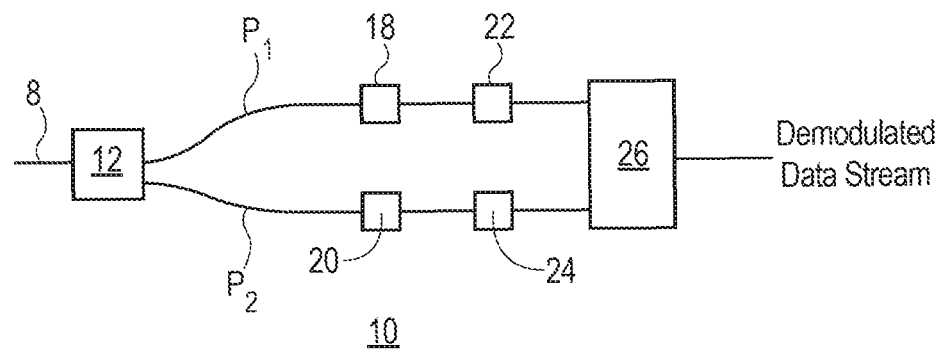
FIG. 1 is block diagram schematically illustrating an embodiment of an optical data receiver.
Figure 2:
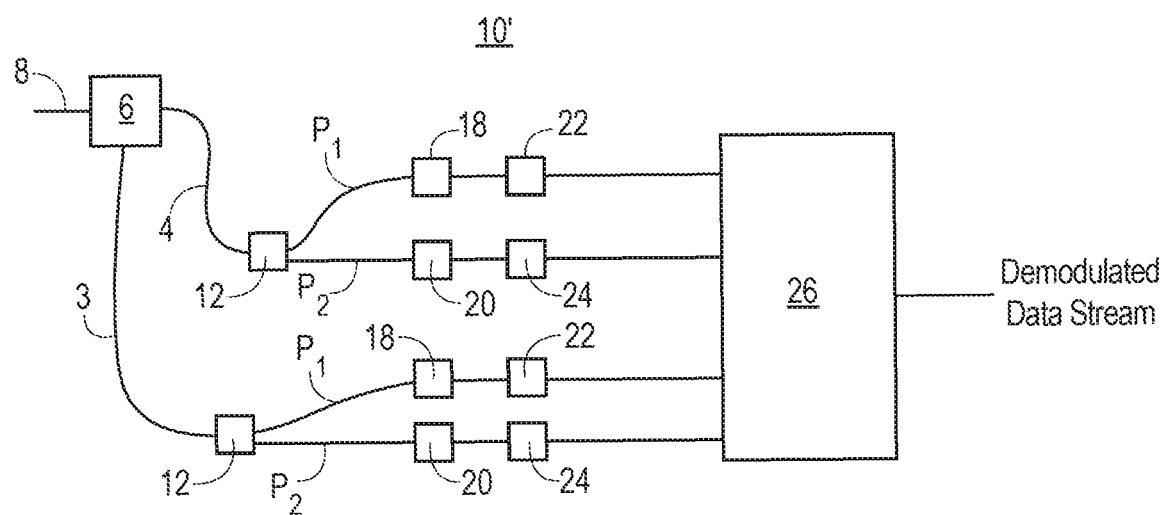
FIG. 2 is a block diagram schematically illustrating an embodiment of an optical data receiver configured to recover data from multiple polarizations and/or lateral-spatial propagation-modes of an optical signal.
Figure 3:
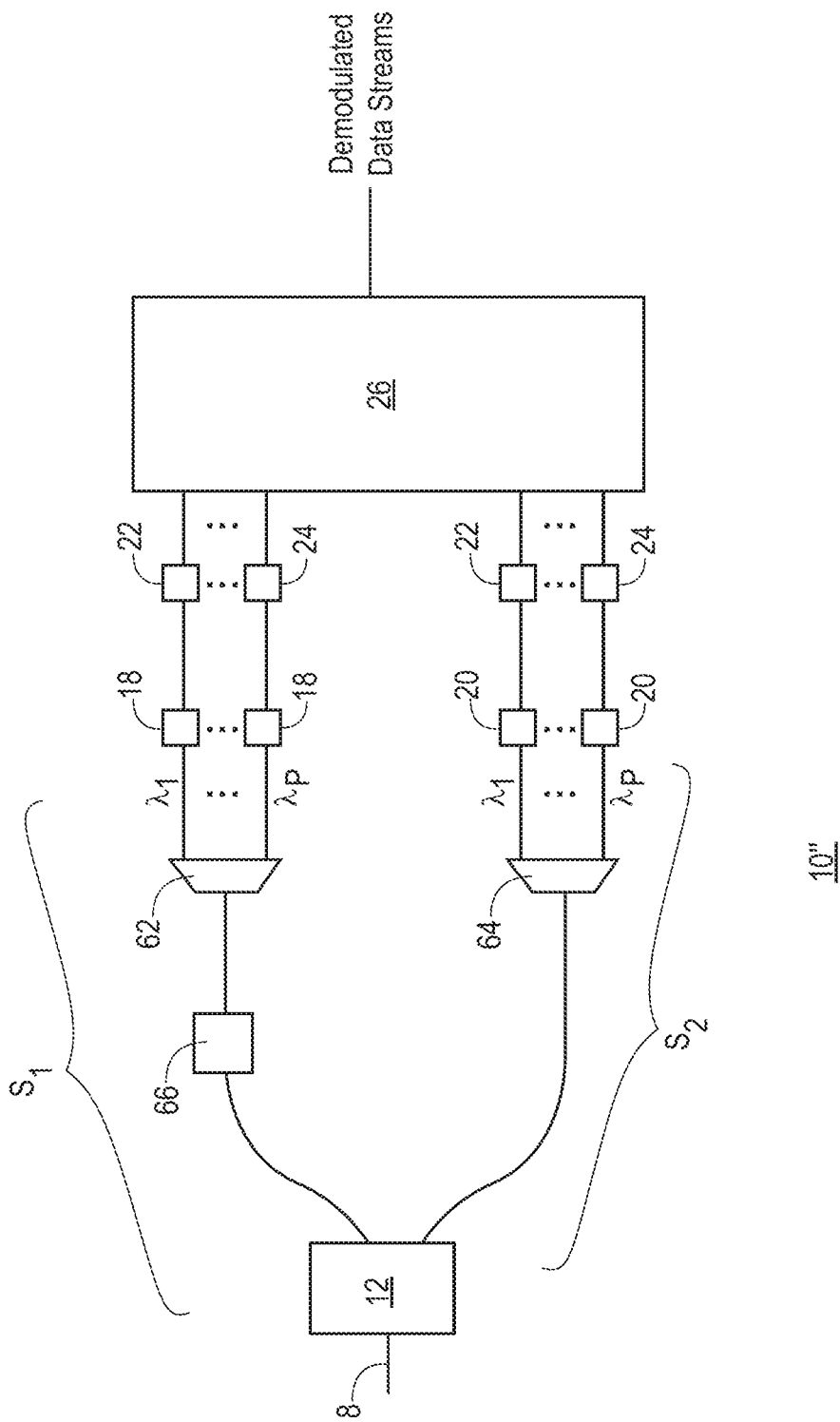
FIG. 3 schematically illustrates an optical data receiver configured to recover data from a plurality of optical wavelength channels, e.g., for wavelength-division multiplexing.
Figure 4:
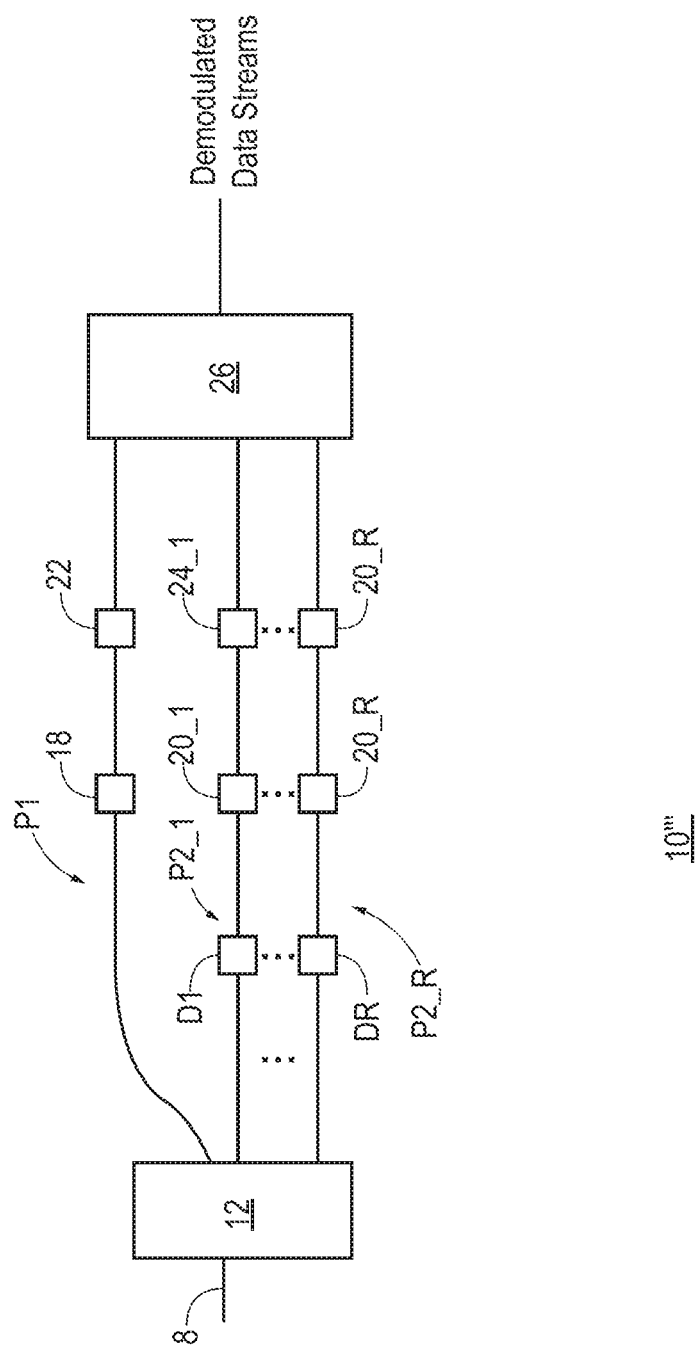
FIG. 4 schematically illustrates an optical data receiver configured to recover data via multi-stage optical processing.

FIGS. 1-5 illustrate various embodiments for optical communications. In the embodiments of FIGS. 1, 2, and 4, "optical signal" typically refers to an optical signal in one wavelength channel. In the embodiments of FIG. 3, "optical signal" may refer to a signal in one optical wavelength or to an "optical signal" combining multiple optical wavelength channels, i.e., according to wavelength division multiplexing (WDM). Thus, various embodiments may be capable of communicating data via optical signals in one or multiple optical wavelength channels.

FIG. 1 schematically illustrates an embodiment of an optical data receiver 10 configured to receive an optical signal from an optical fiber 8, wherein the optical signal is, at least, phase-modulated with data. The optical data receiver 10 includes an optical power splitter 12; separate first and second optical processing paths P1, P2; first and second optical intensity detectors 18, 20; first and second digitizers 22, 24; and a digital signal processor 26.

The optical power splitter 12 receives the data-modulated optical signal from the near end of the optical fiber 8 and causes first and second portions of the optical signal to be directed to respective first and second optical paths P1 and P2. The optical power splitter 12 may be, e.g., any conventional symmetric or non-symmetric passive optical power splitter, e.g., a 1×N 3-dB optical power splitter with N≥2. Typically, the optical power splitter 12 provides about the same dispersion to the portions of the data-modulated optical signal transmitted directed to the inputs of the two paths P1, P2, e.g., a negligible amount of dispersion.

The first and second optical paths P1, P2 optically connect the optical splitting region of the optical power splitter 12 to the respective first and second optical intensity detectors 18, 20. The first and second optical paths P1, P2 optically process light thereon in different manners. For example, the second optical path P2 may introduce more inter-symbol mixing into light processed thereby. For example, the second optical path P2 may have a frequency dependent channel function that causes the phase and/or velocity of light to vary in a manner that depends non-linearly on optical frequency. The frequency dependency may vary quadratically with frequency or may even vary with a higher power of the frequency. In the second optical path P2, the frequency dependency of the optical processing may be, e.g., approximately equivalent to a chromatic dispersion so that the velocity of the optical signal has, at least, some quadratic dependence on frequency in the second optical path P2. The first optical path P1 causes a different optical processing of light therein. In the above example, the first optical path P1 may cause less dependence of the optical signal's phase or velocity on second or higher powers of the frequency, e.g., less dependence on the square of the frequency of the light. For example, the second optical path P2 may simply cause less chromatic dispersion to accumulate while light passes therethrough than while light passes through the first optical path P1. For these reasons, the first and second optical paths P1 and P2 typically produce different amounts of mixing of light from adjacent data symbol periods when said light is emitted at second ends of these optical paths P1, P2.

Typically, one or both of the first and second optical paths P1 and P2 have, at least, a segment that is not a free-space segment, e.g., to introduce non-linear frequency dependent processing, such as chromatic dispersion, into light propagating therethrough. For example, the first and second optical paths P1 and P2 may be formed of segments of the same length of optical fiber of different chromatic dispersions, or the first and second optical paths P1 and P2 maybe formed of segments of the same type of optical fiber having different lengths.

Each of the optical intensity detectors 18, 20 includes a conventional optical intensity detector, e.g., a photodiode or a photo-sensitive transistor. The optical intensity detectors 18, 20 output electrical signals representative of light intensities received therein.

Each of the electrical digitizers 22, 24 includes a conventional electrical analog-to-digital converter to digitize the measured light intensities from the optical intensity detectors 18, 20. The electrical digitizers 22, 24 may optionally include electrical amplifier(s) and/or an electrical low pass filter(s) at electrical input(s) or outputs thereof. The electrical digitizers 22, 24 may, e.g., may produce digital measurements of the measured light intensities at the symbol rate of the data-modulated optical signal or at a positive integer multiple of said symbol rate, e.g., two, three, or a larger integer times the symbol rate.

The DSP 26 is configured to perform digital signal processing on the digital streams of intensity measurements received from the first and second electrical digitizers 22, 24 and to recover therefrom data values carried by the data-modulated optical signal, which are received from the optical fiber 8. The recovery includes recovering, at least, data values phase-modulated on the optical signal. The recovered data values may be the data-carrying phase and optionally amplitude values of the received optical signal, in individual symbol periods, and/or may be or be indicative of in-phase (I) and quadrature-phase (Q) data modulation values carried on the optical signal in individual symbol periods. For example, these values may be estimates of said values, as received, at one of the optical intensity detectors 18, 20 in individual symbol periods or may be estimates of the values received in fractional parts of said symbol periods for higher sampling rates of the electrical digitizers 22, 24. The DSP 26 typically also performs further digital processing to recover the data values carried on the received optical signal. For example, the further digital processing may compensate for undesirable optical effects, e.g., during propagation over the optical fiber 8. Such further processing may, e.g., compensate for optical dispersion, optical attenuation, noise, distortions caused by optical non-linear effects, and/or optical phase rotation and/or frequency shift.

In the DSP 26, the digital processing to recover the data carried by the data-modulated on the optical signal is based, at least, in part on information about the specific channel functions of the first and second optical paths P1 and P2. Herein, a channel function is a number or matrix that determines the sequence of values of an optical signal output by an optical path in response to the optical path receiving a sequence of input values of the optical signal. Said information about the channel functions may be determined prior to operation of the optical data receiver 10, e.g., by training or by pre-programming of the DSP 26 the op. For example, the optical data receiver 10 or the DSP 26 may use receipt of a known training sequence to determine the information about the channel functions. The information, at least, characterizes the relative analog optical processing performed by first and second optical paths P1 and P2. Based on said information on how the first and second optical paths P1, P2 optical process received light, the DSP 26 is able to recover the stream of phase and/or amplitude values carried by the optical signal, e.g., I and Q values, as received, at the optical intensity detectors 18, 20.

The optical data receiver 10 typically only uses light intensity measurements and typically does not measure the interference of said received optical signal with light from a local optical oscillator therein and does not typically measure the interference of relatively delayed portions of said received optical signal, e.g., as interfered in a relative delay, optical interferometer.

In an example embodiment, the DSP 26 may use an iterative algorithm to determine phase values carried by sequential symbols on the received optical signal from only intensity measurements in the optical intensity detectors 18, 20, e.g., in individual symbol periods. That is, direct detection measures sequential intensity values of the optical signal, i.e., without measuring interference of portions of the received optical signal in the optical data receiver 10. At each iteration loop, the algorithm includes a forward step to find an estimate, i.e., $S_{1,e}(t)$, of the first light field output from the first optical path P1, i.e., to estimate $S_1(t)$, includes a backward step to find an estimate, i.e., $S_{2,e}(t)$, of the second light field output from the second optical path P2, i.e., to estimate $S_2(t)$, and may include an iteration step to get an improved estimated value, $S'_{2,e}(t)$, of the second light field output from the second path P2 for use as the initial guess at the next iteration of the loop. For each sequence of R loops, with R>1, or for each loop, the iterative algorithm may also include a step of checking to determine whether one or both of the estimated light field value(s), e.g., $S_{1,e}(t)$ and/or $S'_{2,e}(t)$, has or have converged enough stop repeating the loop of the algorithm.

In the forward step, the actual measured amplitude $A_{2,m}(t)$ and an estimated phase $\Theta_{2,e}(t)$ of the second light field determines an initial guess $S_{2,i}(t)$, i.e., an estimate for the light field output from the second path P2 in a symbol period "t". The initial guesses over a block of sequential symbol times t' is used to find the estimates $S_{1,e}(t')$ of the first light field output from the first path P1 in the same symbol times t'. The initial guess of the second light field, at a time t, is given by $S_{2,i}(t)=A_{2,m}(t)\exp[i\Theta_{2,e}(t)]$, and the estimate of the first light field is given by $S_{1,e}(t)=A_{1,e}(t)\exp[i\Theta_{1,e}(t)]$ at the same time t. The forward step uses known or already determined information on the relative channel function between the first and second paths P1 and P2. For example, if $D2(t)$ is the channel function of the second optical path P2, and $D1(t)$ is the channel function of first optical path P1. Then, for the forward step, the relevant channel function is typically the relative channel function $D(t)=D1(t)[D2(t)]^{-1}$. The forward step may be performed in Fourier space, e.g., by Fourier transforming with respect to frequency "f", over a block of sequential symbol periods t'. Then, the initial guesses of $S_{2,i}(t')$, at times t', give the Fourier transform $S_{2,i}(f)$, i.e., $S_{2,i}(t') \rightarrow S_{2,i}(f)$, multiplying the Fourier transform $S_{2,i}(f)$ by the Fourier transform $D(f)$ of $D(t')$, over the block of sequential times t', and taking an inverse Fourier transform obtains the estimate of the first field, i.e., $S_{1,e}(t)$, output at the first path P in the symbol interval "t".

In the backward step, an improved estimate, i.e., $S'_{1,e}(t')$, of the first light field output from the first path P1, at the times t', is used. The improved estimate uses the actual measured amplitude $A_{1,m}(t')$, of the first light field at time t' and the estimate of the phase $\Theta_{1,e}(t')$ of the first light field from the forward step of the loop, i.e., $S'_{1,e}(t')=A_{1,m}(t') \exp[i\Theta_{1,e}(t')]$. In the backward step, improved estimate, i.e., $S'_{1,e}(t')$, over the block of times t', of the first light field is used to obtain an improved estimate of the second light field, i.e., $S'_{2,e}(t')$, output from the second path P2 in times t'. The backward step again uses the relative channel function for the first and second optical paths P1 and P2. Here, the relevant product of the channel functions is the inverse of D(t), i.e., $[D(t)]^{-1}$. The backward step may be performed in Fourier space by obtaining a Fourier transform $S'_{1,e}(f)$ of the improved estimate of the first light field $S'_{1,e}(t')$, i.e., $S'_{1,e}(t') \rightarrow S'_{1,e}(f)$, multiplying the Fourier transform $S'_{1,e}(f)$ by the Fourier transform of the inverse of the relative channel function, i.e., multiplying Fourier transform $S'_{1,e}(f)$ by the Fourier transform of $[D(t')]^{-1}$, i.e., $D^{-1}(f)$, and taking an inverse Fourier transform thereof to obtain the improved estimate, $S'_{2,e}(t)$, of the second light field output by the second optical path P2, i.e., to obtain $S'_{2,e}(t)=A_{2,e}(t) \exp[i\Theta'_{2,e}(t)]$, in a symbol interval "t".

In the iteration step, the improved estimate of the phase of the second light field in the symbol interval "t", i.e., $\Theta'_{2,e}(t)$, may be used as an initial guess of the phase of the second light field for the next loop of the algorithm, or alternatively, the improved estimate of the phase $\Theta'_{2,e}(t)$ may be used to get another estimate for the initial phase $\Theta_{2,e}(t)$ of the second light field for the next loop of the algorithm. For example, in the next loop, the initial phase $\Theta_{2,e}(t)$ of the second light field may be given by the replacement $\Theta_{2,e}(t)=\Theta'_{2,e}(t)+\mu[\Theta'_{2,e}(t)-\Theta_{2,e}(t)]$. In the last equation, values on the left side are values for the next loop, and values on the right side are values of the present loop. Also, µ is a loop-increment parameter, which may be a constant or may be adaptively updated. For example, an adaptive update may be made by $\mu=\text{mean}[|A_{2,m}(t)-A'_{2,e}(t)|]$ where $A'_{2,e}(t)=|S'_{2,e}(t)|$, and the mean may be, e.g., a mean over the block of sequential times of the block. The new value of $\Theta_{2,e}(t)$ is the initial guess of the phase of the second light field for the next iteration of the loop in the iterative algorithm.

The looping portion of the algorithm may be stopped, e.g., when a loop's improvement to the phase of the second light field has a magnitude, i.e., $|\Theta'_{2,e}(t)-\Theta_{2,e}(t)|$, or a mean value thereof below some fixed threshold value or may be stopped when the loop's improvement to the phase of the first light field has a magnitude or a mean thereof below a threshold value.

A person of skill in the relevant arts would understand from the present disclosure that the loop of the algorithm could be iterated and stopped in various different manners, e.g., based on different conditions and/or replacement definitions.

In some embodiments, the loop of the iterative algorithm may also use known pilot symbols to increase the rate of convergence. For example, such an embodiment may be based on digitally processing a block of sequentially measured intensity values of the first and second light fields in each performance of the loop of the algorithm, i.e., in Fourier and inverse Fourier transforms. In such embodiments, for symbol(s) of the block where a phase of the first or second light field corresponds to a pilot symbol, the phase is known, and the known phase value of the pilot may itself be used in the loop of the iterative algorithm to improve convergence thereof. The use of such pilot symbols would typically require training between an optical data transmitter, which transmits the optical signal, and the optical data receiver 10 so that the optical data receiver can identify the temporal symbol periods of pilot symbols during optical communications.

In the forward and backward steps of the algorithm, the Fourier and inverse-Fourier transforms may be adjusted to apply bandwidth or bandpass constraints, e.g., associated with the physical optical channel(s).

In various embodiments, the relative channel function D(t), which is used in the algorithm, may have an approximately linear dispersion.

Also, in some embodiments, which employ polarization multiplexing, the pilots may be precalculated for phase recovery based on the polarization coupling in the channel(s).

In some such embodiments, temporally overlapping blocks of sequentially measured intensities of the light fields are used to evaluate the Fourier transforms in the above-described iterative algorithm. In such embodiments, the converged results of iterative estimates of phase values may only be finally retained, i.e., at the termination of the iterative algorithm, for non-overlapping portions of the blocks so that evaluations do not depend significantly on the size(s) of the blocks used in the algorithm.

In some embodiments, the iterative algorithm may be performed in parallel for different sets of initial guesses for the phases of the second light field output at the second path P2, and the parallel algorithm may be stopped when any one of the evaluations of a parallel set produces converged values for the sequential phases of the symbols of a segment of the block of sequential symbols. Then, the set of converged values may be taken as the estimates of the phase values of the received light field(s) of symbols in the optical data receiver 10. Using such separate parallel calculations with different initial guesses of the phase of the second light field can substantially increase the rate of convergence of the iterative algorithm.

In some embodiments, other circuits of the DSP 26 may digitally perform optical equalization, e.g., to compensate for chromatic dispersion, polarization rotation and/or polarization mode dispersion. Also, the results of such a digital optical equalization may also be fed back to the loops of the iterative algorithm to improve estimates of the phases of the first and/or second light fields and thereby further aid the convergence of the iterative algorithm or the rate of convergence thereof, e.g., to correct values of pilot symbols. Also, such feedback may be used to adjust intensity measurements of different polarizations of pilot symbols in embodiments of the DSP 26 of the optical data receiver 10' of FIG. 2.

The above-described iterative algorithm is a modified algorithm of a Gerchberg-Saxton type.

FIG. 2 schematically illustrates an embodiment of an optical data receiver 10' that supports polarization and/or propagation-mode multiplexing, e.g., to support lateral-spatial propagation-mode multiplexing in the optical fiber 8. In such an embodiment, different polarization modes and/or different fiber spatial propagation modes may carry differently data-modulated optical signals, e.g., in the same wavelength range.

The optical data receiver 10' includes an optical demultiplexer 6 and also includes two optical power splitters 12; paired first and second optical paths P1, P2; two pairs of first and second optical intensity detectors 18, 20; two pairs of first and second digitizers 22, 24; and a digital signal processor 26.

The optical demultiplexer 6 is connected to receive light from the near end of the optical fiber 8 and to direct part of the received light to a first output direction 3 and to direct another part of the received light to a second output direction 4 in an optical polarization and/or lateral spatial propagation-mode dependent manner. In particular, the optical demultiplexing may be according to polarization if the received optical signal is polarization multiplexed, in the optical fiber 8, or may be according to lateral-spatial propagation-mode if the multiplexing, in the optical fiber 8, is according to lateral spatial propagation mode. In some embodiments, the optical demultiplexing may combine orthogonal polarization multiplexing and orthogonal lateral-spatial propagation-mode demultiplexing.

In each separate output direction 3, 4, the optical signal is processed, as already described with respect to FIG. 1, by the corresponding optical power splitter 12; first and second optical processing paths P1 and P2; first and second optical intensity detectors 18, 20; and first and second digitizers 22, 24 connected to said output direction 3, 4.

The DSP 26 is configured to process the sets of digital values of measured intensities from each separate output direction 3, 4 as already described with respect to FIG. 1. In particular, said processing is configured to recover, at least, one or more sequences of phase values modulated onto the part of the optical signal directed to each output direction 3, 4, e.g., based only on measurements of optical intensities, i.e., direct detection measurements therein, as already described with respect to FIG. 1. Such digital processing may also include feedback, in the DSP 26, from the recovery of the data modulated onto the parts of the optical signal directed to both directions 3, 4 to improve convergence of the process to recover phase-modulation values from the parts of the optical signal directed to each direction 3, 4. For example, such feedback may include feedback from equalizer(s) of the DSP 26 that correct for polarization rotation and/or polarization mode dispersion and/or for coupling of lateral-spatial propagating-modes along the optical fiber 8.

The optical data receiver 10' of FIG. 2 has been schematically illustrated as having an optical demultiplexer 6 with two optical outputs and two corresponding directions 3 and 4 for separate optical processing. But, the present inventions are intended to also include embodiments in which the optical demultiplexer 6 includes more than two optical outputs that connect to more than two separate output directions 3, 4 for processing. Such embodiments could process optical signals that multiplex data over more than two orthogonal lateral-spatial propagating-modes of the optical fiber 8 and/or that multiplex data over multiple lateral-spatial propagating-modes and over multiple polarizations thereof.

FIG. 3 schematically illustrates an optical data receiver 10" for recovering data from P optical wavelength channels, i.e., channels $\lambda_1, \ldots, \lambda_P$. Here, P is an integer greater than one. The part of the optical signal in each optical wavelength channel may, e.g., carry a separate or independent data stream, e.g., via, at least, phase-modulation. The optical data receiver 10" has a shared chromatic dispersive medium for the entire collection of P optical wavelength channels $\lambda_1$-$\lambda_P$.

The optical data receiver 10" has an optical power splitter 12 whose two outputs connect to respective first and second sets $S_1, S_2$ of optical paths. From the optical power splitter 12, each set S1, S2 receives a portion of the data-modulated optical signal, received from optical fiber 8, for the collection of optical wavelength channels $\lambda_1$-$\lambda_P$. Each of the first and second sets S1, S2 also includes an optical wavelength demultiplexer 62, 64 that directs light of individual optical wavelength channels to corresponding ones of the optical intensity detectors 18, 20 of arrays thereof. In the first set S1, the first portion of the data-modulated optical signal, i.e., a WDM optical signal, propagates through a single chromatically dispersive element 66 so that the collection of optical wavelength channels shares a chromatically dispersive medium, e.g., a long path of dispersive optical fiber or a path of optical fiber of different dispersion than the optical fiber path of the other set S2.

To recover the data modulated onto a single optical wavelength channel of the received data-modulated optical signal, the DSP 26 uses intensity measurements for that optical wavelength channel by the corresponding pair of optical intensity detectors 18, 20. For said intensity measurements of the individual optical wavelength channel, the DSP 26 performs digital processing, e.g., as already described with respect to FIG. 1, to recover the data stream modulated onto that optical wavelength channel of received optical signal.

FIG. 4 schematically illustrates an optical data receiver 10"' configured to recover data via multi-stage optical processing for a data-modulated optical signal in a single optical wavelength channel.

The optical data receiver 10"' is similar to the optical data receiver 10 of FIG. 1 But, the optical power splitter 12 of FIG. 1 is replaced with an optical power splitter 12 having R+1 optical outputs, with R>1. The new optical power splitter 12 may be any conventional passive optical power splitter with R+1 optical outputs, e.g., a symmetric or a non-symmetric optical power splitter. Here, the second optical path P2 of FIG. 1 is also replaced by a parallel array of R second optical paths P2_1 . . . P2_R. Each of the R optical paths P2_1 . . . P2_R has a chromatically dispersive element D1 . . . DR, which causes different amounts of accumulated chromatic dispersion to portions of the received data-modulated optical signal propagating over the various second optical paths P2_1 . . . P2_R.

In the optical data receiver 10"', the DSP 26 is configured to recover the data stream modulated onto the optical signal iteratively over R stages of digital and optical processing. At each stage, the DSP 26 uses optical intensity measurements by the optical intensity detector 18 for the first path P1 and optical intensity measurements by one of the R optical intensity detectors 20_1 . . . 20_R of a selected one of the R second optical paths P2_1 . . . P2_R to estimate the symbol values carried by the received optical signal. The initialization values of the optical signal for the K-th stage of digital processing may be, e.g., a value of the optical field from the earlier evaluated (K–1)-th stage of processing by the DSP 26 for recovery of the data stream, wherein said earlier evaluation was performed with intensity measurements of a different one of the second optical paths P2_1 . . . P2_R. Since dispersions of the different second optical paths P2_1 . . . P2_R may be set to different values, the inventors believe that such a "staged" approach to recovery of the data stream may aid the algorithm of the DSP 26 to converge faster and/or more reliably for some selections of the dispersions of R chromatically dispersive elements D1 . . . DR.

Figure 5:
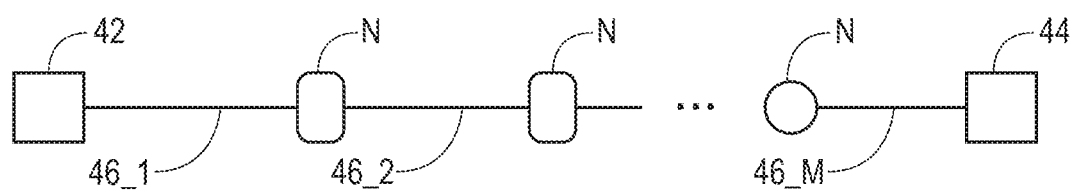
FIG. 5 is a block diagram schematically illustrating an optical fiber communication system, e.g., including one of the optical data receivers of FIG. 1-5.

FIG. 5 is a block diagram schematically illustrating an optical fiber communication system 40. The optical fiber communication system 40 includes an optical data transmitter 42 and an optical data receiver 44, which are optically coupled by a sequence of one or more optical fiber spans 46_1, 462, . . . 46_M, i.e., with M=1, 2, 3, . . . . In embodiments with more than one of the optical fiber spans 46_1 . . . 46_M, adjacent ones of the optical fiber spans 46_1 . . . 46_M may be all-optically end-connected at nodes N therebetween. The optical data transmitter 42 transmits data by, at least, optically phase-modulating an optical carrier, e.g., according to a quadrature phase shift keying or a quadrature amplitude modulation scheme. The optical data receiver 44 may be configured to operate as one of the optical data receivers 10, 10', 10", 10'" schematically illustrated in FIGS. 1-4.

Figure 6:
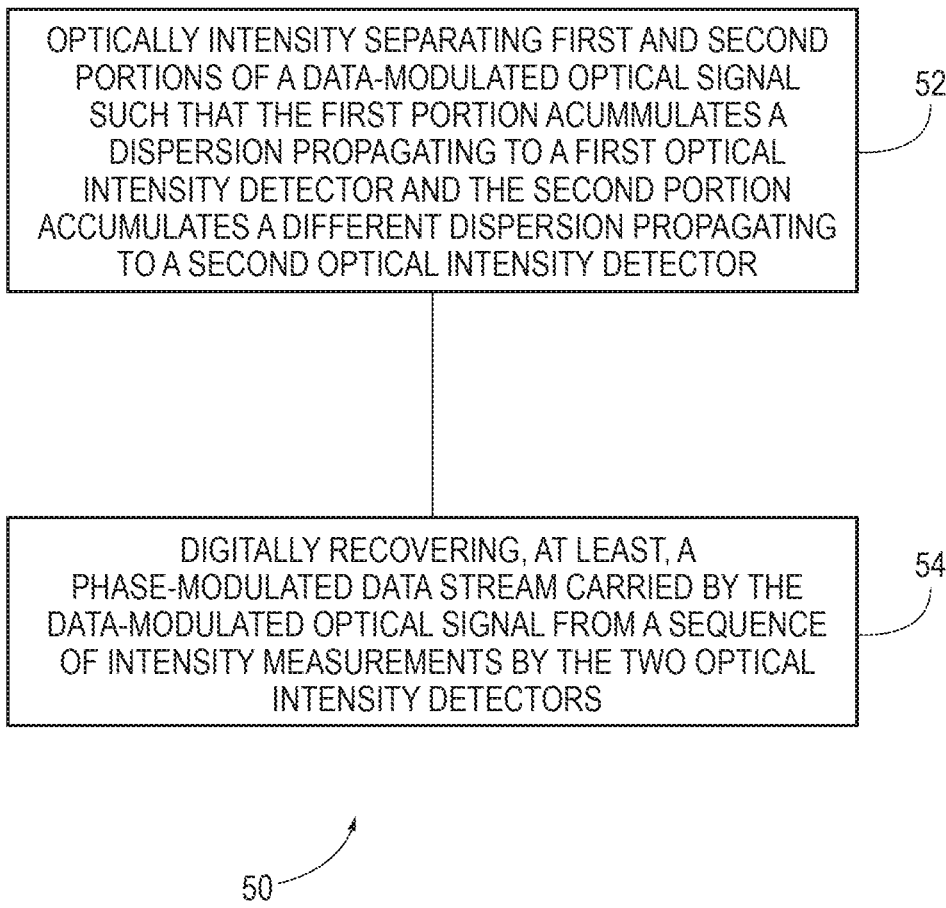
FIG. 6 is a flow chart schematically illustrating a method of operating an optical data receiver, e.g., for operating any of the optical data receivers of FIGS. 1-5.

FIG. 6 schematically illustrates a method 50 of operating an optical data receiver, e.g., the optical data receivers 10, 10', 10", 10'", 44 of FIGS. 1-5. The optical data receiver is configured to recover data from a phase-modulated optical signal via direct detection, e.g., data modulated onto I and Q components of an optical carrier. That is, the optical data receiver does not optically interfere portions of the received optical signal with other portions thereof or with light of a local optical oscillator in the optical data receiver.

The method 50 includes optically intensity splitting a received data-modulated optical signal, in an optical receiver to separate first and second portions thereof such that the first portion propagates to a first optical intensity detector and the second portion propagates to a different second optical intensity detector (step 52). The first portion accumulates one chromatic dispersion between a region of the splitting and the first optical intensity detector, and the second portion accumulates a different chromatic dispersion between the region of the splitting and the second optical intensity detector. For example, in FIGS. 1 and 2, the splitting typically causes the first and second portions to propagate to the respective first and second optical intensity detectors via the different first and second optical paths P1 and P2, which may cause different amounts of chromatic dispersion to be accumulated there along.

In step 52, the optical intensity splitting or separating may be performed with any conventional passive optical power splitter, e.g., the optical intensity splitter 10 of FIGS. 1-2. For example, the optical intensity splitting may be performed via a 1×Q symmetric or non-symmetric optical power splitter where the integer P is greater than or equal to 2.

The first and second optical paths may have various forms. For example, the two optical paths may be formed of optical fibers providing different accumulated chromatic dispersions, e.g., due to the different fiber lengths, different fiber compositions, different optical core dimensions or different fiber core-cladding index contrasts. One or both of the optical paths may include a lumped optical device to provide part or all of the above-mentioned difference in the frequency dependence between the channel functions of the two optical paths.

The method 50 includes digitally recovering, at least, a phase-modulated data stream carried by the data-modulated optical signal from a sequence of intensity measurements on the separated portions thereof by the optical intensity detectors (step 54). The measurements are responsive to the separating of the received data-modulated optical signal.

In some embodiments, the method 50 may involve recovering phase-modulated data from two or more different lateral spatial propagation modes of a spatial division multiplexed optical signal and/or from two different polarizations of a polarization multiplexed optical signal.

In some embodiments, the method 50 further includes, at the optical data receiver, optical propagation-mode demultiplexing the data-modulated optical signal into multiple parts. The digitally recovering includes, at least, recovering phase-modulated data from intensity measurements on separate ones of the parts.

In some embodiments, the method 50 further includes, at the optical data receiver, optical polarization demultiplexing the data-modulated optical signal into multiple parts. The digitally recovering includes, at least, recovering phase-modulated data from intensity measurements on separate ones of the parts.

In some embodiments, the method 50 further includes determining a relative channel function or an inverse thereof for optical propagation backward from one of the optical intensity detectors to the region of the splitting or separating of the received data-modulated optical signal and then, optical propagation forward from the same region to the other of the optical intensity detectors.

In various embodiments, the method 50 may be used in optical data receiver(s) of a metro optical fiber network, a long-haul optical fiber network, and/or an optical short-reach fiber communication network, e.g., an optical communication network between data centers.

From the disclosure, drawings, and claims, other embodiments of the invention will be apparent to those skilled in the art.

What is claimed is:

1. An apparatus, comprising:
   an optical data receiver to receive a phase-modulated optical signal and to demodulate data therefrom, the optical data receiver comprising an optical power splitter, first and second optical intensity detectors, and a digital signal processor; and
   wherein the digital signal processor is connected to receive digital values of intensity measurements of each of the optical intensity detectors;
   wherein the first optical intensity detector is connected to receive light of one wavelength channel from the optical power splitter via a first optical path and the second optical intensity detector is connected to receive light of the one wavelength channel from the optical power splitter via a second optical path; and
   wherein the first and second optical paths have channel functions with different frequency dependencies.

2. The apparatus of claim 1, wherein the digital signal processor is configured to recover, at least, phase-modulated data from the optical signal based on the digital values of intensity measurements of the optical intensity detectors.

3. The apparatus of claim 1, wherein the first and second optical paths are configured to produce different amounts of dispersion.

4. The apparatus of claim 3, wherein the digital signal processor is configured to recover, at least, phase-modulated data from the optical signal based on the digital values of intensity measurements of the optical intensity detectors.

5. The apparatus of claim 2, wherein the optical data receiver is configured, at least, to recover phase-modulated data from the optical signal without mixing the optical signal with light from a local optical oscillator.

6. The apparatus of claim 2, wherein the optical data receiver is configured to recover, at least, phase-modulated data from the received optical signal without interfering a first portion of the optical signal with a relatively delayed, second portion of the optical signal.

7. The apparatus of claim 1, wherein the optical data receiver is configured, at least, to recover phase-modulated data from two polarizations of a polarization multiplexed optical signal.

8. The apparatus of claim 1, wherein the optical data receiver is configured to recover phase-modulated data from, at least, two optical lateral-spatial propagation-modes of a propagation-mode multiplexed optical signal.

9. The apparatus of claim 2, wherein the optical data receiver is configured to determine a channel function for optical propagation along one of the optical paths and then, optical propagation along the other of the optical paths.

10. The apparatus of claim 2, wherein the apparatus further comprises an optical data transmitter configured to phase-modulate data onto an optical carrier and optically connected to transmit the phase-modulated optical carrier to the optical data receiver.

11. The apparatus of claim 3, wherein the apparatus further comprises an optical data transmitter configured to phase-modulate data onto an optical carrier and optically connected to transmit the phase-modulated optical carrier to the optical data receiver.

12. The apparatus of claim 1, wherein each optical intensity detector comprises an array of optical intensity detectors, each optical intensity detector of the array being connected to a different optical output of an optical wavelength demultiplexer.

13. The apparatus of claim 1, wherein the optical data receiver further comprises a third optical intensity detector connected to the optical power splitter via a third optical path; and wherein the digital signal processor is connected to receive digital values of intensity measurements of the third optical intensity detector and the third optical path has a channel function with different frequency dependency than the first and second optical paths.

14. A method, comprising:
  in a direct-detection optical data receiver, optically intensity separating first and second portions of a data-modulated optical signal such that one wavelength channel of the first portion of the data-modulated signal accumulates a first chromatic dispersion by propagating to a first optical intensity detector and the one wavelength channel of the second portion of the data-modulated signal accumulates a different second chromatic dispersion by propagating to a second optical intensity detector; and
  digitally recovering a phase-modulated data stream carried by the one wavelength channel of the data-modulated optical signal from a sequence of intensity measurements received from the optical intensity detectors, the measurements being responsive to the separating.

15. The method of claim 14, further comprising, at the optical data receiver, lateral-spatial propagation-mode demultiplexing the data-modulated optical signal into multiple parts; and
  wherein the digitally recovering includes, at least, recovering phase-modulated data from intensity measurements on individual ones of the parts.

16. The method of claim 14, further comprising, at the optical data receiver, optical polarization demultiplexing the data-modulated optical signal into multiple parts; and
  wherein the digitally recovering includes, at least, recovering phase-modulated data from intensity measurements on individual ones of the parts.

17. The method of claim 14, further comprising determining a channel function for optical propagation backward from one of the optical intensity detectors to a region of the separating and then, optical propagation forward from the region to the other of the optical intensity detectors.

18. The method of claim 14, further comprising optical wavelength demultiplexing each portion such that the intensity measurements include intensity measurements for different optical wavelength channels.

19. The method of claim 1,
  wherein the optically intensity separating causes a third portion of the data-modulated optical signal to accumulate a third chromatic dispersion by propagating to a third optical intensity detector, the third chromatic dispersion being different both of the first and second chromatic dispersions; and
  wherein the digitally recovering is based on digital values of intensity measurements by the third optical intensity detector.

* * * * *